United States Patent
Seward et al.

(10) Patent No.: US 9,584,657 B1
(45) Date of Patent: Feb. 28, 2017

(54) CONVEYING DEVICE INFORMATION TO APPLICATION SERVER SERVICING COMPUTING DEVICE ASSOCIATED WITH A COMMUNICATION

(71) Applicant: T-Mobile USA, Inc., Bellevue, WA (US)

(72) Inventors: Shelby Seward, Bellevue, WA (US); Robert F. Piscopo, Jr., Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 14/854,652

(22) Filed: Sep. 15, 2015

(51) Int. Cl.
- *H04M 3/42* (2006.01)
- *H04L 29/06* (2006.01)
- *H04W 8/22* (2009.01)

(52) U.S. Cl.
CPC .... *H04M 3/42229* (2013.01); *H04L 65/1006* (2013.01); *H04L 65/1016* (2013.01); *H04W 8/22* (2013.01)

(58) Field of Classification Search
None
See application file for complete search history.

(56) References Cited

U.S. PATENT DOCUMENTS

| | | | |
|---|---|---|---|
| 7,299,037 B2* | 11/2007 | Hospes | H04M 1/66 455/410 |
| 2005/0107114 A1 | 5/2005 | Ocock | |
| 2007/0153771 A1* | 7/2007 | Doradla | H04L 12/66 370/352 |
| 2009/0061872 A1 | 3/2009 | Hicks | |
| 2013/0229948 A1* | 9/2013 | Stewart | H04M 3/42246 370/259 |
| 2015/0289128 A1* | 10/2015 | Leis | H04L 65/1016 370/328 |

FOREIGN PATENT DOCUMENTS

| | | |
|---|---|---|
| JP | 2005244817 | 9/2005 |
| KR | 1020070033631 | 3/2007 |
| KR | 1020150052424 | 5/2015 |

OTHER PUBLICATIONS

PCT Search Report and Written Opinion mailed Nov. 25, 2016 for PCT Application No. PCT/US16/50527, 15 pages.

\* cited by examiner

*Primary Examiner* — Daniel Lai
(74) *Attorney, Agent, or Firm* — Lee & Hayes, PLLC

(57) ABSTRACT

When authorized, a user of a computing device, such as a smart phone, may place a communication using an originating number that is different from the number assigned to the computing device. An IMS application server that handles requests for the computing device associated with the originating number is notified when the telephone number assigned to the computing device is used by a different computing device. The notification to the IMS application server might include, but is not limited to device information, location information, and the like. After being notified of the communications terminated by other computing devices that are associated with the device number, accurate call records may be provided regarding the communications involving the originating number.

20 Claims, 5 Drawing Sheets

CONVEYING DEVICE INFORMATION TO APPLICATION SERVER SERVICING COMPUTING DEVICE ASSOCIATED WITH A COMMUNICATION

BACKGROUND

A computing device, such as a wireless phone, that is capable of terminating (e.g., receiving or originating) phone calls and other communications is typically associated with a particular phone number. The computing device can originate phone calls whose calling number is the particular phone number or may receive communications at the particular phone number. In some cases, a person may carry multiple computing devices in order to have the use of different phone numbers. Not only is this cumbersome for the user, but wasteful because the user has to acquire multiple computing devices.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Figure 1:
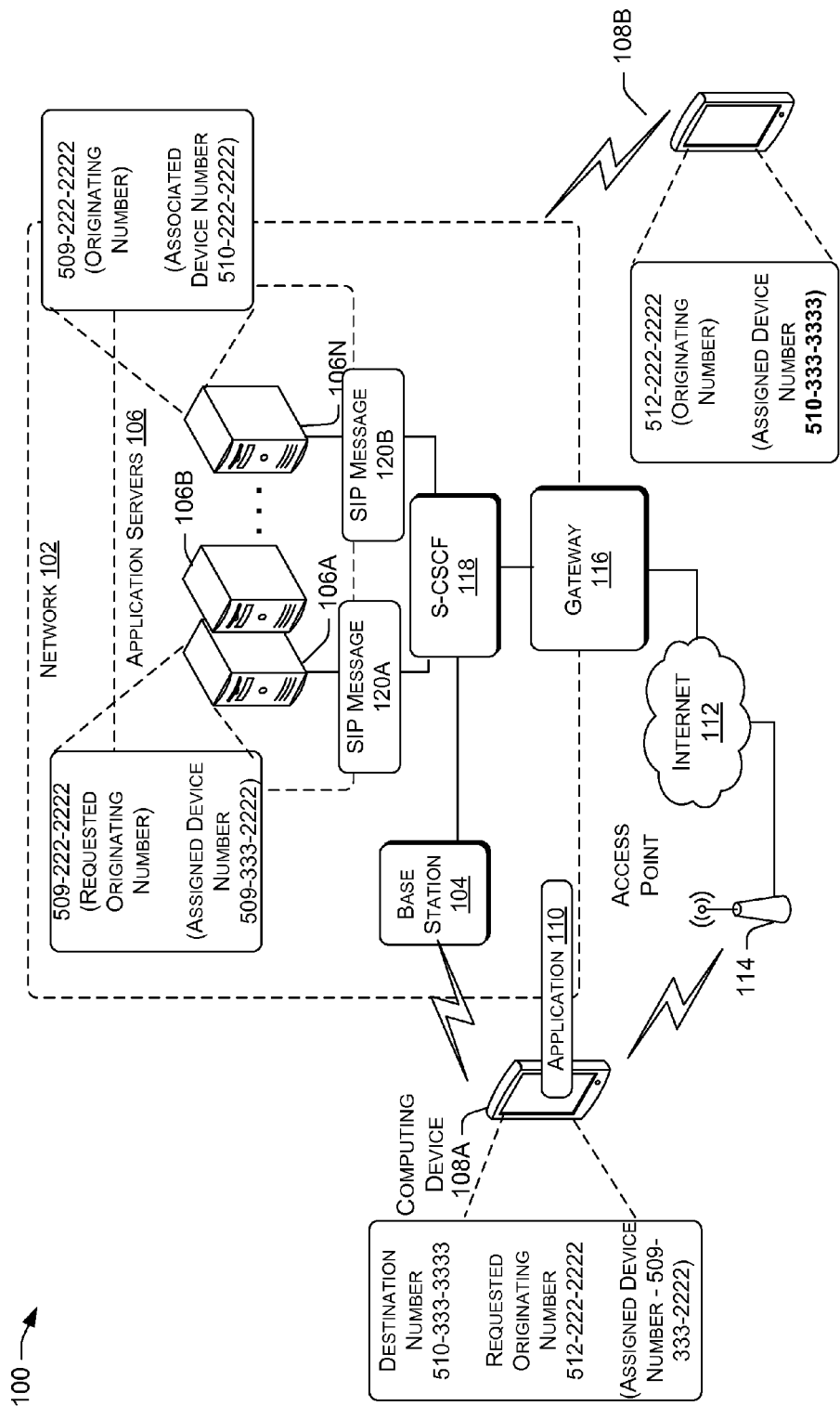
FIG. 1 is a block diagram showing an illustrative environment for notifying an application server of communications made using a device number associated with a computing device assigned to the application server.

Described herein are techniques and systems for conveying device information to an application server. Using techniques described herein, an IMS application server that handles requests for a computing device is notified when the telephone number assigned to the computing device is used by a different computing device. The notification to the IMS application server might include, but is not limited to device information, location information, and the like.

In some configurations, a computing device, such as a smart phone, may utilize a telephone number to originate or receive a communication other than the device number assigned to the computing device. For instance, instead of each computing device having to use the assigned telephone number, more than one computing device may use the same telephone number to make or receive calls or other types of communications (e.g., a Short Message Service (SMS) message, or a Multimedia Messaging Service (MMS) message). After being associated with a particular telephone number, a computing device may receive and/or originate communications using the associated number as well as use the number assigned to the device.

When a user acquires (e.g., purchases, leases, etc.) a computing device, such as a wireless phone, the wireless service provider (e.g., a carrier, such as T-Mobile®) may assign an International Mobile Subscriber Identity (IMSI) and/or an E.164 address (e.g., up to a fifteen digit telephone number) that is specific for the user associated with the computing device. As used herein, a "device number" is the E.164 address or identity assigned (such as an IMSI) to the computing device by the wireless service provider.

In some configurations, the wireless service provider may allow a user to associate one or more other computing devices with the device number. For example, a user might access an interface, such as a web page, provided by the wireless service provider to specify associations of a particular device number with one or more other computing devices. In other examples, the user might use a graphical user interface (GUI), such as a telephony client, or some other interface, to associate computing devices with a device number assigned to a particular computing device. In some cases, the user might authorize a computing device associated with another subscriber of the wireless service to utilize a device number. In other cases, a user might associate a group of computing devices with a particular device number. For instance, a business owner might allow computing devices of employees of the business to be associated with a business number.

After a user has authorized another device to be associated with a device number, a caller may place a call that originates from that device number or receive a call that is made to the device number. Generally, requests made by a computing device to send a communication (e.g., a voice call, an SMS message, or an MMS) message) are handled by a particular application server assigned to handle requests for that computing device. As such, when a device communicates using an originating number that is not assigned to the device, the application server assigned to the computing device associated with the originating number would typically not be notified of the communication. Instead, the application server of the computing device making the communication handles the request and stores the communication record. Using the techniques described herein, the application server assigned to handle the requests for the computing device assigned to the originating number receives a notification of the communications using the originating number. For example, a control node in the service provider network conveys device information for the communication utilizing the originating number to the correct application server. In this way, information about the communications associated with a particular number may be stored by a same application server regardless of what computing device utilized the number.

In some configurations, the application server assigned to handle requests for the originating number may receive data such as device information and location information for the computing device utilizing the device number. For example, the device information might include device identifying data (e.g., IMEI, a serial number, or the like) and the location information might include location data (e.g., GPS coordinates, networks utilized, and the like). More or less information may be provided.

After being notified of the communications terminated by other computing devices that are associated with the device number, accurate call records may be provided regarding the communications involving the device number. For example, the application server assigned to handle the requests for the device number will have an accurate record for the communications made using the device number since the application server is notified of any use of the number by another computing device. In other examples, the notification information might be utilized for other purposes. For instance, the location information may be utilized when providing location-based services. More details are provided below with regard to FIGS. 1-5.

FIG. 1 is a block diagram showing an illustrative environment 100 for notifying an application server of communications made using a device number associated with a computing device assigned to the application server. The environment 100 may include a network 102 that is operated by a wireless service provider. Generally, the environment 100 may provide an IP multimedia subsystem (IMS) that supports communication services over a Session Initiation Protocol (SIP) infrastructure. The environment 100 is illustrated in simplified form and may include many more components.

As illustrated, the network 102 may include one or more base stations 104, one or more serving call session-control nodes (S-CSCF) 118, and one or more application servers 106. While not shown, more components may be included within the environment 100. For example, the environment 100 may include a home subscriber server (HSS), a multimedia resource function control (MRFC), a multimedia resource function processor (MRFP), a proxy CSCF (P-CSCF), an interrogating CSCF (I-CSCF), and the like.

A base station 104 may handle traffic and signals between electronic devices, such as the computing devices 108A and 108B, and a core network of the network 102. For example, the base station 104 may perform the transcoding of speech channels, allocation of radio channels to electronic device, paging, transmission and reception of voice and data, as well as other functions. The base station 104 may include several base transceiver stations (BTS), each BTS may include a transceiver, antenna, and additional network switch and control equipment that provide a network cell for facilitating wireless communication between computing devices and the core network of the network 102.

The core network may be responsible for routing voice communication to other networks, as well as routing data communication to external packet switched networks, such as the Internet. For example, the one or more application servers 106 may be a Gateway GPRS Support Node (GGSN) or another equivalent node. The computing devices 108A and 108B may be a smart phone, a personal digital assistant, a netbook, a laptop computer, and/or another electronic that is capable of sending or receiving voice or data via the network 102 and/or a Wi-Fi network.

Generally, the S-CSCF 118 registers users associated with computing devices 108A-108B with the network 102 and assists in providing services to them. In some examples, the S-CSCF 118 routes SIP messages (e.g., requests and other messages), such as SIP messages 120A-120B, between computing devices 108 provides billing information, maintains session timers, and may retrieve authorization, service information, user profiles, and the like from some component or device (e.g., an HSS) within the network 102. For example, the S-CSCF 118 may determine what application server 106 is to receive requests made by a computing device 108.

The application servers 106 handle and interprets the SIP messages forwarded by the S-CSCF 118 and send SIP messages utilizing the S-CSCF 118. In some configurations, one or more of the application servers 106 may be configured to provide support for one more applications, such as application 110. While the application servers 106 are illustrated within the network 102, one or more other computing devices may be located outside of the network 102. For example, an application server, or some other server or device, may be connected to the network 102 via one or more external packet switched networks, such as the Internet.

According to some configurations, a telephony client application, such as application 110, on the computing device 108 may establish data communication with the network 102 through a data connection to the base station 104. The base station 104 may route a communication from the communication device 108 through the core network via the application servers 106. In such instances, the application servers 106 may be capable of performing subscriber profile insertion with respect to data traffic between the application 110 on the computing device 108 and the application server.

For example, the application 110 may be a calling application that is requesting to place an outgoing call to a destination number "510-333-3333." In the current example, the computing device 108A is requesting to place the call using the originating number "512-222-2222" even though the device number that is assigned to the computing device 108A is "509-333-2222". As discussed briefly above, a user authorized to associate a device number with the computing device 108A may have established the association using an interface coupled to the network 102. For instance, a user may have used a web interface to establish the association of the computing device 108A with the device number already associated with another device. In some examples, the application servers 106, the S-CSCF 118, or some other device or component, may store this association data within a memory or database.

In some examples, in response to receiving a request to place a call to the destination number, the S-CSCF 118, or the application server 106 receiving the request may determine the computing device that is associated with the requested origination number. For example, the S-CSCF 118, or the application server 106 that receives the request may perform a look up that identifies that computing device associated with the requested originating number "510-222-2222".

In the current example, assume that the application server 106A receives the request from the computing device 108A to place a call to "510-333-3333" using the originating number "510-222-2222". In this particular example, the application server 106A is assigned to handle requests made from the computing device 108A that is assigned the device number "509-333-2222". For purposes of this example, assume that the application server 106N is assigned to handle requests made from the computing device 108 (not shown) that is assigned the device number "512-222-2222". The S-CSCF 118, or the application server 106, may retrieve the association data that corresponds to the IMSI of the computing device 108 that is associated with the requested originating number. The data may include information identifying the computing device, the application server 106 assigned to the computing device (e.g., application server 106N) associated with the requested originating number.

After determining the application server 106 assigned to handle the requests for the computing device associated with the requested originating number, the S-CSCF 118 may send the SIP message 120B to the application server 106N notifying the application server 106N of the use of the originating number "512-222-2222". For example, the S-CSCF 118, or some other node, may modify the header of the SIP message 120B to include information related to the communication using the requested originating number. In other examples, the S-CSCF 118, or some other node, may modify and/or create a Multi-Purpose Internet Mail Extensions (MIME) attachment to a SIP method to convey the information. For instance, a node such as a SIP registration node, a proxy, or an application server affiliated with the network of the wireless service provider may be utilized.

As discussed above, the information might include data relating to the device (e.g., device information identifying the device), location information for the computing device 108A (e.g., GPS data), time of the communication, whether the receiving computing device received the communication, a length of the communication, and the like. In some examples, the information may include but is not limited to information as referenced in 3GPP 24.229 Table 7.2A.4, Globally Routable User Agent URI (GRUU), sip.instance (IMEI- or Universal Unique Identifier (UUID) based), other geodetic or civic location information passed in SIP headers or a MIME attachment (example PIDF-LO referenced by IETF RFC 5139, IETF RFC 5491, IETF RFC 4119), last accessed or currently accessed cellular information described as a cell global identifier (CGI) (defined in 3GPP TS 23.003 with IETF RFC 3455) if included in a header outside of P-Access-Network-Info.

In some configurations, the device information conveyed to the application server 106N that is associated with the requested originating number can be configured to be relayed in the header for which it was relayed originally. In other examples, the device information can be conveyed in a new SIP header or headers that relays this information as a single informational element or combinatorial elements of the data combined to the application server. According to some examples, the S-CSCF 118 may convey the device information. In other examples, an application server 106 may convey the device information to the application server 106N. For instance, the originating IMS application server 106A may convey the device information to the IMS application server 106N when the communication is an originating communication such as the current example. According to other examples, the terminating IMS application server 106 that receives the communication may convey the device information to the IMS application server 106N when the communication is received by the application server.

For originating SIP methods, the device information can be configured to be sent from the original IMS application server 106A to another application server 106 so that the subsequent application server can keep the information to correlate records when two IMS application servers 106 are used for a single SIP session/dialogue/event or SIP single method or used during processing of a SIP session/dialogue/event. This information could be configured or coded in the software to be sent in any originating SIP method, during any SIP message during or after session/dialogue establishment, or in any SIP error/response code.

For terminating SIP methods, as device information is not applicable in the original termination of a SIP message to start a SIP session/dialogue/event, such device-specification information can be configured or coded into the application server software to be sent back in a SIP message during session/dialogue/event establishment or in any SIP error/response code. This information could be configured or coded in the software to be sent in any originating SIP method, during a SIP message during or after session/dialogue establishment, or in a SIP error/response code. According to some examples, filters can be placed, but not mandated, at a SIP Proxy or element whereby SIP messages traverse to remove any headers for which an administrator does not wish to allow such headers to pass to the next SIP proxy or SIP endpoint.

According to some configurations, the application 110 on the computing device 108 may connect to the application servers 106, or some other component such as an application server, via the Internet 112. In such instances, the application 110 may connect to the Internet 112 via Wi-Fi access point 114. Accordingly, data traffic from the application 110 may be routed to the application servers 106 by the gateway 116 of the network 102.

In either case, the computing device 108 requests to make a communication (e.g., a call, an SMS, an MMS, or some other form of electronic communication) with a destination number. The network 102 receives the request and, in some cases, may authenticate the user and/or the computing device. For example, the application servers 106 may authenticate that the computing device 108. In some cases, the application servers 106 may query a database, or some other data store or memory, to determine the originating number and the computing devices associated with the requested destination number.

Using the determined originating number, the network 102 may initiate the communication to the identified computing devices associated with the destination number. For example, the network initiates communication with the computing device 108B. As illustrated, the display of the computing device 108B shows that the originating number is "512-222-2222" even though the assigned device number of the computing device 108A is "509-333-2222". As such, the called party may view the communication as being originated by the associated device number even though the call was originated by a device in which the assigned device number is different. More details are provided below.

Figure 2:
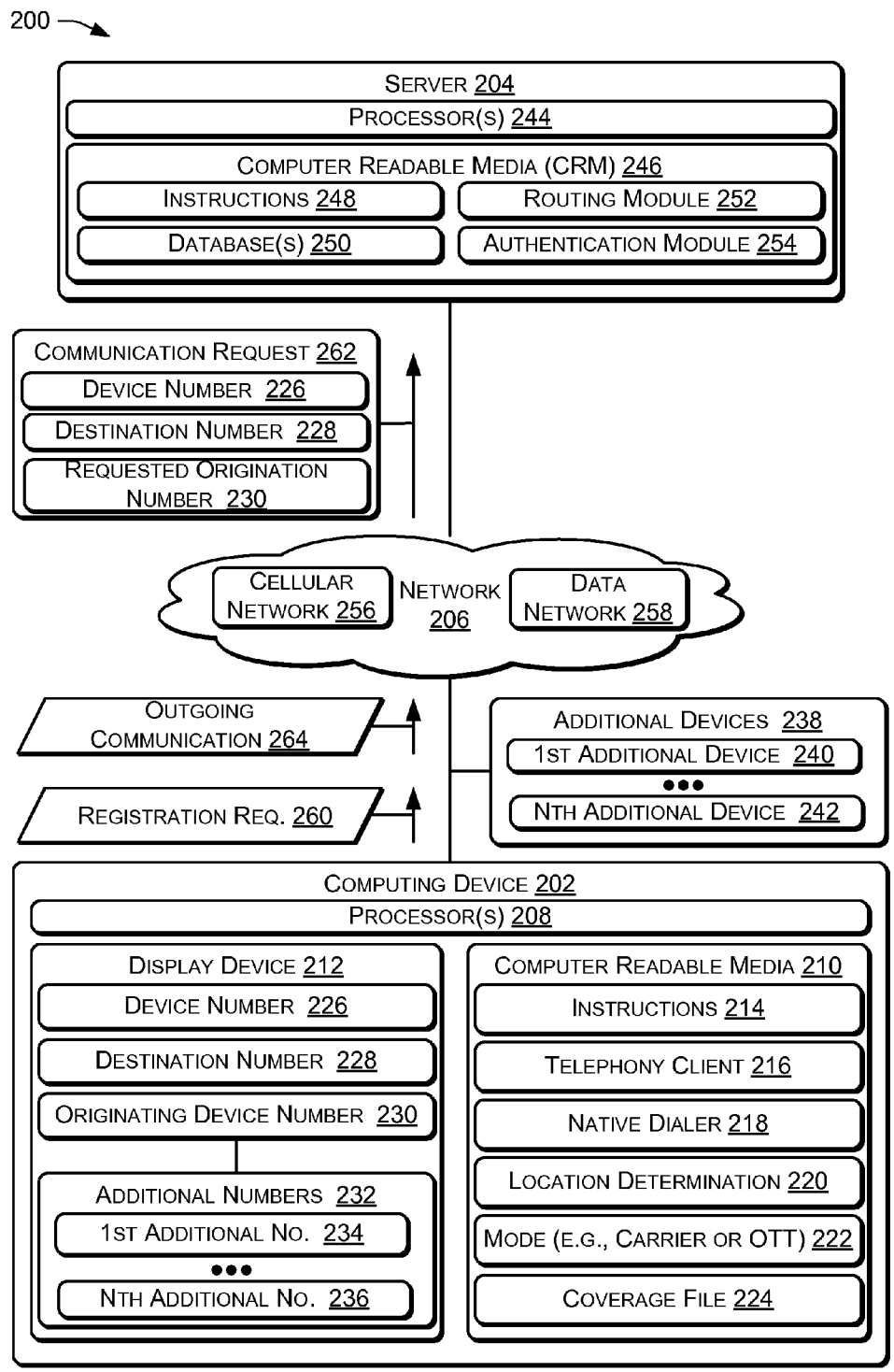
FIG. 2 is a block diagram illustrating a system that includes a telephony client application for originating a communication from an associated device number of a computing device instead of the assigned device number.

FIG. 2 is a block diagram illustrating a system 200 that includes a telephony client application for originating a communication from an associated device number of a computing device instead of the assigned device number according to some implementations. The system 200 includes a computing device 202 coupled to a server 204 via a network 206. The computing device 202 may be configured similarly to the computing device 108. Similarly, the network 206 may be the same network as network 102 illustrated in FIG. 1.

The computing device 202 may be a wireless phone, a tablet computer, a laptop computer, a wristwatch, or other type of computing device. The computing device may include one or more processors 208 and computer readable media, such as memory (e.g., random access memory (RAM), solid state drives (SSDs), or the like), disk drives (e.g., platter-based hard drives), another type of computer-readable media, or any combination thereof.

The computer readable media 210 may be used to store instructions to perform various functions and to store data. For example, the computer readable media 210 may include instructions 214, a telephony client 216, a native dialer 218, a location determination module 220, a current mode 222 of operation, and a coverage file 224. Of course, the computer readable media 210 may also include other types of instructions and data, such as an operating system, device drivers, etc. The telephony client 216 may enable a user to place a communication (e.g., a voice call, an SMS, or an MMS) and/or associate a device number with one or more computing devices. For instance, the telephony client 216 may be used by a user to place a call that originates from a number that is different from the phone number associated with the user's wireless phone.

The native dialer 218 (also known as a mobile dialer) may be an application that enables calls to be originated via Voice over Internet Protocol (VoIP) using Session Initiation Protocol (SIP) signaling. The location determination module 220 may determine a current location of the computing device 202. For example, the location determination module 220 may determine the current location using the Global Positioning System (GPS). The current location as determined by the location determination module 220 may determine the mode 222. For example, if the current location of the computing device 202 is within a geographic area in which a carrier, associated with a device number 226 of the computing device 202, provides coverage, then the mode 222 may be set to carrier mode. If the current location of the computing device 202 is in a geographic area in which the carrier does not provide coverage (e.g., a location in which a wireless phone associated with the device number 226 would normally roam), then the mode 222 may be set to Over-The-Top (OTT) mode.

The display device 212 may be separate from the computing device 202 or integrated (e.g., as illustrated in FIG. 2) with the computing device 202. The display device 212 may display various information associated with originating a call. For example, the display device 212 may display one or more of the device number 226, or other numbers that are authorized to be used as an originating number 230 that is selected from one of the additional numbers 232. In addition to being used as a conventional 10 digit phone number, the device number 226 may also be used as a Uniform Resource Identifier (URI), e.g., as an Internet Protocol (IP) Multimedia Private Identity (IMPI), a unique permanently allocated global identity assigned by a home network operator (e.g., the carrier).

The destination number 228 may be the number of another user to communicate with or call. In other words, the destination number 228 is the location to which the call is routed. As discussed herein, the originating device number 230 that is associated with an outgoing call may be different from the device number assigned to the computing device. By default, the originating number 230 may be the device number 226 that is associated with the device.

The additional numbers 232 may include numbers that are authorized to be associated with other computing devices by the user. For example, the user might be authorized to associate numbers associated with (i) family members of a user of the computing device 202, (ii) businesses (or other activities) associated with the user of the computing device 202, (iii) friends, or all or some combination of (i), (ii), and (iii). The additional numbers 232 may be assigned to additional devices 238. For example, the first additional number 234 may be assigned to a first additional device 240 and the Nth additional number 236 may be assigned with an Nth additional device 242. An authorized user, may associate the same number to one or more of the additional devices 242.

The server 204 may include one or more processors 244 and one or more computer readable media 246. The computer readable media 246 may be used to store instructions 248, one or more databases 250, a routing module 252, and an authentication module 254. The instructions 248 may be executed by the processors 244 to perform the various functions described herein. The databases 250 may include a database storing information, such as which additional numbers are associated with a device number, etc. The routing module 252 may be used to setup and route calls from the computing device 202 in which the originating device number 230 is different from the device number 226 that is assigned to the computing device 202.

The authentication module 254 may perform various types of authentication, including determining whether the user associated with the device number 226 is authorized to associate one or more of the additional numbers 232 with another device. For example, the authentication module 254 may be used to authenticate that a user is authorized to associate a selected number.

The network 206 may include one or more networks, such as a cellular network 256 and a data network 258. The cellular network 256 may provide wide-area wireless coverage using a technology such as Global System for Mobile (GSM), Code Division Multiple Access (CDMA), Universal Mobile Telephone Service (UMTS) or the like. While communications between the cellular network 256 and computing devices (e.g., the computing device 202) may be performed using a wide-area wireless network, the cellular network 256 may include other technologies, such as wired (Plain Old Telephone Service (POTS) lines), optical (e.g., Synchronous Optical NETwork (SONET) technologies, and the like.

The data network 258 may include various types of networks for transmitting and receiving data (e.g., data packets), including networks using technologies such as Institute of Electrical and Electronics Engineers (IEEE) 802.11 ("WiFi"), IEEE 8021.15.1 ("Bluetooth"), Asynchronous Transfer Mode (ATM), Internet Protocol (IP), and the like. The term "data network" refers to the data packets that are transmitted and received within the data network 258. The data packets may be used to carry voice traffic using VoIP or other technologies as well as data traffic.

In some situations, such as after being powered-on or at periodic intervals, the computing device 202 may use the location determination module 220 to determine a current location of the computing device 202 and set the mode 222 to either carrier mode (e.g., when the current location is in a service area of a carrier associated with the device number 226) or OTT mode (e.g., when the current location is outside a service area of a carrier associated with the device number 226).

The telephony client 216 may send a registration request 260 to register the computing device 202 with a local carrier's network. For example, the telephony client 216 may send the registration request 260 to the server 204 to register the computing device 202 with the local carrier associated with the network 206. The registration request 260 may be received by the server 204 that may be configured as a serving call session control function ("S-CSCF") server that is part of an internet protocol multimedia subsystem ("IMS"). The registration request may include a feature tag that specifies different features to register for with one or more application servers. For example, the feature tag may include features, such as, but not limited to a multimedia telephony ("MMTEL") feature, a short message session initiation protocol ("SMSIP") feature, a rich communication services ("RCS") feature, and the like. In some configurations, the registration request 260 may also indicate to register the computing device to use an originating device number 230 in place of the device number 226.

The registration request 260 may indicate whether the computing device is registering in cellular mode (e.g., to use the cellular network 256) or OTT mode (e.g., to use the data network 258). In cellular mode, the computing device 202 may originate calls and terminate calls using the cellular network. In OTT mode, the computing device 202 may originate calls and terminate calls using the data network 258 (e.g., via VoIP).

When a user desires to originate a communication using the computing device 202, the telephony client 216 may prompt the user to select (or enter) the destination number 228 (e.g., the destination of the call). The number used as the originating number by the network may default to the device number 226, or some other originating device number 230 that the device is authorized to use.

The computing device 202 may send, to the server 204, a communication request 262 that includes the assigned device number 226, an originating device number 230 if different from the assigned device number 226, and the destination number 228. The communication request 262 informs the server 204 that a communication will be placed from a device (e.g., the computing device 202) that is associated with the device number 226 to the destination number 228.

In some examples, the originating device number 230 is used as the caller identifier (e.g., instead of the device number 228). As such, the call will appear to the person being called as originating from the originating device number 230 rather than the assigned device number 226. For example, a user may use the user's personal phone (e.g., computing device) to place a call that appears to originate from the user's business (or other activity in which the user engages) rather than the user's personal phone. The user is thus able to keep the user's personal phone number private (e.g., because the caller identifier displayed to the called party is the originating device number 230) while still making use of the user's personal phone to place calls for the user's business (or other activity). As another example, a spouse may use the user's computing device (e.g., phone) to place a call that appears to originate from the spouse's computing device rather than the user's computing device. For example, if the spouse's computing device is inoperable (e.g., dead battery etc.) or unavailable (e.g., spouse left it behind), the spouse can place calls using the user's computing device while the calls appear to originate from the spouse's computing device. In this way, family members can place calls from a single computing device while making the calls appear as if they were originating from the family member's computing device. As another example, an employee of a business may use their phone, or other computing device, to place a call that appears to originate from a line that appears to originate from the business.

After receiving the communication request 262, the authentication module 254 may authenticate the communication request 262 and determine whether the account associated with the device number is authorized to originate calls from the originating device number 230. For example, the authentication module 254 may retrieve account information from the database(s) 250 to determine if the account associated with the device number 226 is authorized to originate calls from the originating device number 230. When the account associated with the device number 226 is not authorized to originate calls from the originating device number 230, the server 204 may send a message to the computing device 202 denying the communication request 262. When the account associated with the device number 226 is authorized to originate calls from the originating device number 230, the server 204 may place the communication to the computing device(s) associated with the destination number 228. The server 204 may also provide communication information, such as described above, to the application server 108 that is assigned to handle requests for the originating device number 230.

When a communication request 262 is received by the network 206 for routing to a particular computing device (e.g., the computing device 202), the network 206 determines the destination number 226. The destination number 226 may be associated with a single computing device or more than one computing device.

In some examples, the routing module 252 may change the call record associated with the outgoing communication 264 such that the outgoing communication 264 appears to be originating from the originating device number 230 rather than the device number 226. For example, the call record may initially identify the device number 226 as the number from which the outgoing communication 264 is being placed. The routing module 252 may change the communication record associated with the outgoing communication 264 by substituting the associated device number 230 for the device number 226 in the call record, making the outgoing communication 264 appear to have been placed from a device associated with the associated device number 230. This information may be provided to the application server 108 configured to process the requests for the computing device that is assigned to the originating device number 230.

Figure 3:
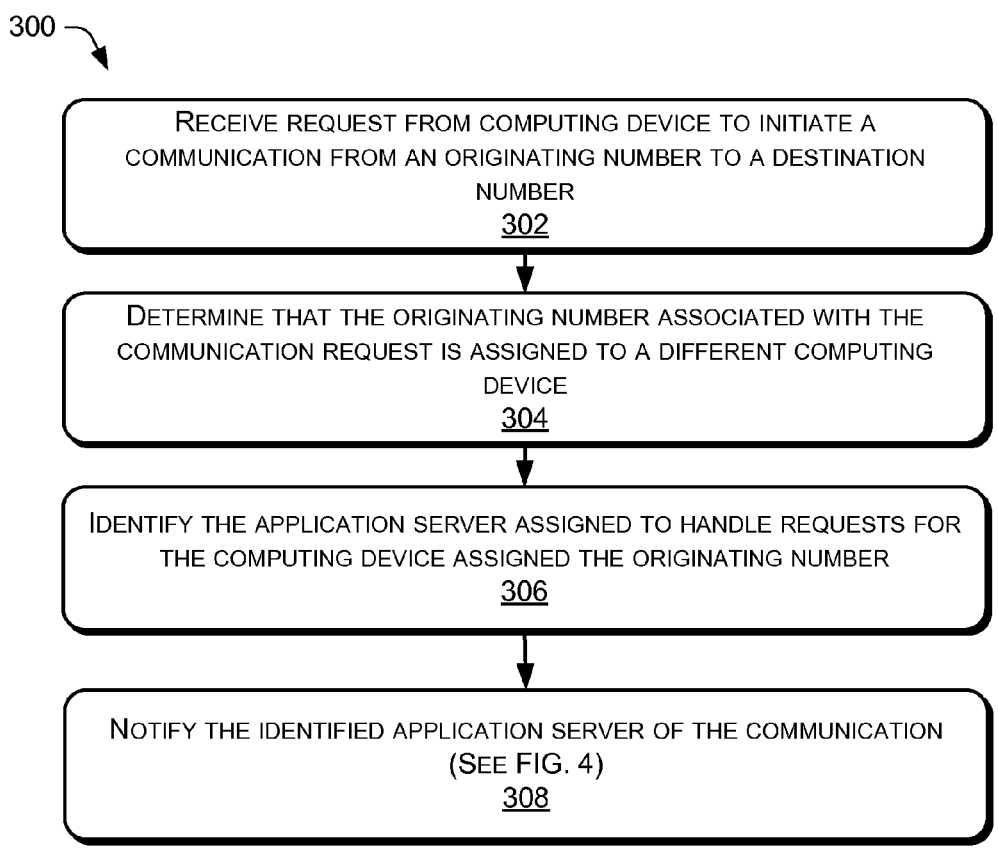
FIG. 3 is a flow diagram of an example process that includes notifying an application server for communications using a device number serviced by the application server.
Figure 4:
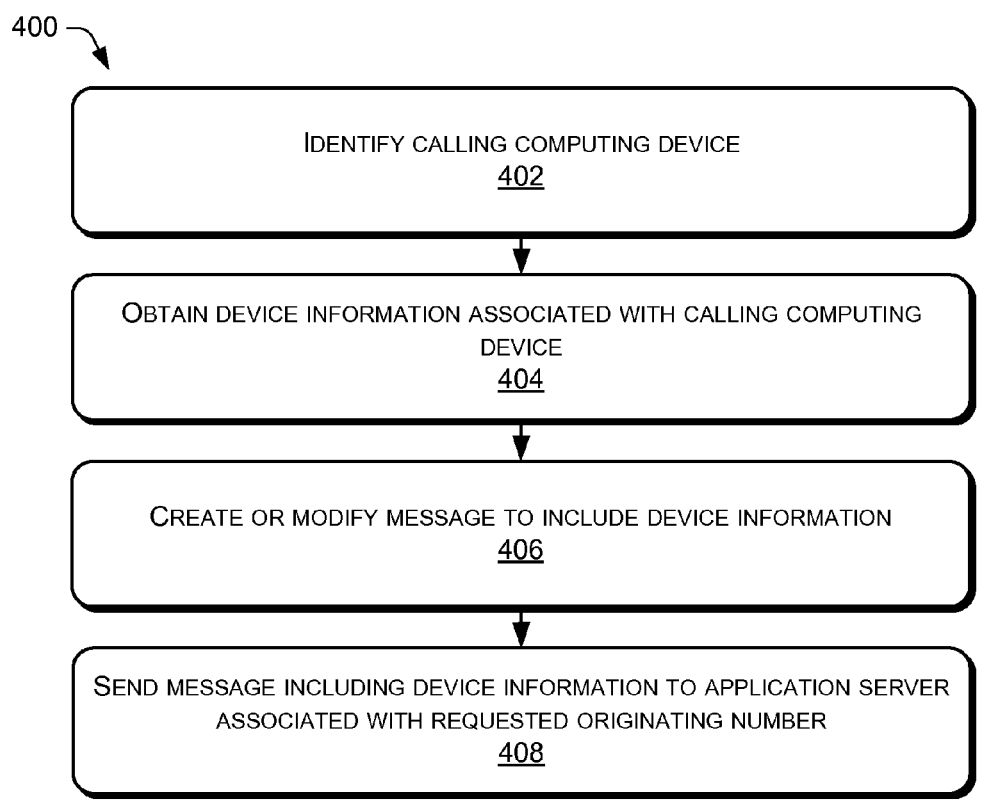
FIG. 4 is a flow diagram of an example process that includes obtaining device information for a computing device using another device number.
Figure 5:
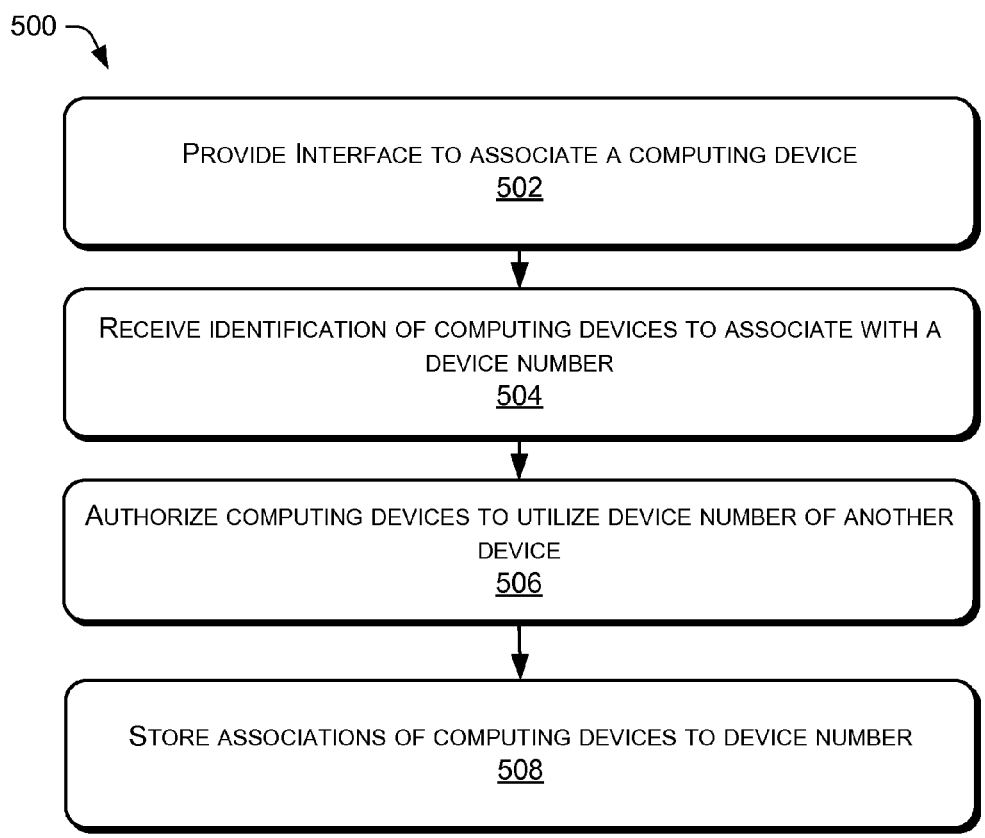
FIG. 5 is a flow diagram of an example process that includes authorizing other computing devices to use a device number assigned to a particular computing device.

In the flow diagrams of FIGS. 3, 4, and 5, each block represents one or more operations that can be implemented in hardware, software, or a combination thereof. In the context of software, the blocks represent computer-executable instructions that, when executed by one or more processors, cause the processors to perform the recited operations. Generally, computer-executable instructions include routines, programs, objects, modules, components, data structures, and the like that perform particular functions or implement particular abstract data types. The order in which the blocks are described is not intended to be construed as a limitation, and any number of the described operations can be combined in any order and/or in parallel to implement the processes. For discussion purposes, the processes 300, 400, and 500 are described with reference to the systems 100, 200, as described above, although other models, frameworks, systems and environments may implement these processes.

FIG. 3 is a flow diagram of an example process 300 that includes notifying an application server for communications using a device number serviced by the application server. The process 300 may be performed by one or more computing devices, such as the computing devices described with regard to FIGS. 1-2.

At 302, a request is received from a computing device to initiate a communication from an originating number to a destination number. As discussed above, the request may be a request to originate a voice call, send an SMS or MMS, or some other type of electronic communication. As also discussed, a computing device may be authorized to request a communication using a telephone number other than the device number that is assigned to the computing device. In some examples, any user may authorize another user to use one or more of their device numbers with a computing device. In other examples, a subscriber affiliated with a wireless network provider may authorize other subscribers of the wireless network provider to use one or more device numbers affiliated with the subscriber.

At 304, a determination is made that the originating number associated with the communication request is assigned to a different computing device. As discussed above, the user may select (e.g., using a graphical user interface) an originating number that is associated with a different computing device as compared to the computing device the user is requesting to place the communication. In some examples, after the application server 106 receives the request from the computing device 108B and the S-CSCF 118 identifies that the originating number is associated with a different computing device. For instance, the S-CSCF 118 accesses a database to determine the registration information associated with the computing device 108 making the request. In other examples, the application server 106 receiving the request can identify that the originating number is associated with a different computing device. For example, the application server 106 may access or query a database, or some other component or device, within the network 102 to determine the application server 106 assigned to process requests for the requested originating number.

At 306, the application server assigned to handle requests for the computing device assigned the originating number is identified. As discussed above, registration data may be stored by the network (e.g., by an application server or some other computing device within the service provider network 102) that identifies the computing devices that are associated with a particular device number. The registration data may include, but is not limited to, the device numbers associated with a particular computing device, an identifier that uniquely identifies the computing devices, and any preferences that may be specified. For instance, the preferences may specify communication preferences for a telephone number. In some examples, the S-CSCF 118 accesses registration information for the computing devices to determine the computing device 108 associated with the requested originating number and to identify the application server 106 that is assigned to the originating number.

At 308, the identified application server is notified of the communication. As discussed above, an application server, or some other computing device, may modify a SIP message to include the device information. The SIP message is then sent to the identified application server.

FIG. 4 is a flow diagram of an example process 400 that include obtaining device information for a computing device using another device number according to some implementations. The process 400 may be performed by one or more computing devices, such as the computing devices described with regard to FIGS. 1-2.

At 402, the computing device requesting the communication is identified. As discussed above, a user may initiate a communication or receive a communication from another computing device. In some examples, one or more of the application servers 106 may access a data store, or some other memory, to retrieve and identify the computing devices that are associated with the destination number. For example, the application servers 106 may access a data store, or some other memory, to retrieve and identify the computing devices that are involved in a communication. In some configurations, the computing device 108 provides identifying data to the application server 106 assigned to handle requests from the computing device 108. In other configurations, the application server 108, the S-CSCF 118, or some other component of the network 102, may query or access a data store (e.g., registration information) to identify the computing device 108.

At 404, device information associated with the computing device is obtained. According to some configurations, the application server 108, the S-CSCF 118, or some other component of the network 102, may obtain the device information. As discussed above, the device information may include location information for the computing device 108. For example, the location information may include a location of the computing device 108 (e.g., GPS data) as well as other data associated with the computing device 108, such as networks being utilized, capabilities of the computing device 108, unique identifying data for the computing device 108, and the like.

At 406, a message is created and/or modified to include the device information obtained at 404. As discussed above, the S-CSCF 118, an application server 106, or some other device or component may modify a SIP message that is to be delivered to the application server 106 associated with the requested originating number. In some examples, the SIP message that is modified may be a message that is sent in the normal messaging. In other examples, a new SIP message may be created. In yet other examples, some other type of message (other than SIP) may be created or modified.

At 408, the message is sent to the application server associated with the requested originating number. As discussed above, the S-CSCF 118 may send the message defined at 406 to the application server 106 assigned to handle requests received from the computing device 108 associated with the requested origination number.

FIG. 5 is a flow diagram of an example process 500 that includes authorizing other computing devices to use a device number assigned to a particular computing device. The process 500 may be performed by one or more computing devices, such as the computing devices described with regard to FIGS. 1-2.

At 502, an interface to associate a computing device with a device number already assigned to a computing device is provided. As discussed above, the interface may be a portal that allows a user to associate one or more computing devices with a particular device number. In some examples, the user may be authorized to assign device numbers associated with computing devices they own and possibly other device numbers that may be associated with other subscribers of the wireless network. For instance, a business owner may authorize one or more of the employees to assign a particular device number to one or more other computing devices.

According to some configurations, device numbers that may be associated with other computing devices may be displayed to the user. For instance, the user may be authorized to use other numbers that are associated with family members, friends, business associations, and the like. In some examples, any user may authorize another user to use one or more of their device numbers with a computing device. In other examples, a subscriber affiliated with a wireless network provider may authorize other subscribers of the wireless network provider to use one or more device numbers affiliated with the subscriber.

At 504, an identification of computing devices to associate with a device number assigned to a particular computing device is received. As discussed above, the user may select (e.g., using a graphical user interface) one or more computing devices 102 that they are authorized to use to associate with the device number. In other examples, the user might use a voice interface to specify the originating number or specify the originating number using some other interface.

At 506, the identified computing devices are authorized to use the device number. As discussed above, registration data may be stored by the network (e.g., by an application server or some other computing device) that identifies the computing devices that are associated with a particular device number. The registration data may include, but is not limited to, the device number to associate, the device number and/or some other identifier that uniquely identifies a computing device that is to be associated with the device number, and any preferences that may be specified. For instance, the preferences may specify communication preferences for the associated number. In some examples, the registration data includes the SIP Address of Record (AOR) and/or any SIP identity used in signaling. For instance, the registration data may include data in a SIP implicit registration set associated with the registered or temporary registered SIP identity participating in un-registered IMS services. In some examples, the registration data includes data relating to registration that was passed among SIP application servers/proxies/registrars, and/or other computing devices involved in the signaling. The communication preference may specify to always send communications to the computing device, send communications to the device when currently being used, and the like.

At 508, the data specifying the associations is stored. As discussed above, an application server, or some other computing device, may store the preferences within a database, or some other memory. In some examples, the data is stored as hunt groups. In other examples, the data is stored as registration data (e.g., within a lookup table, or some other data structure for access).

The various techniques described above are assumed in the given examples to be implemented in the general context of computer-executable instructions or software, such as program modules, that are stored in computer-readable storage and executed by the processor(s) of one or more computers or other devices such as those illustrated in the figures. Generally, program modules include routines, programs, objects, components, data structures, etc., and define operating logic for performing particular tasks or implement particular abstract data types.

Other architectures may be used to implement the described functionality, and are intended to be within the scope of this disclosure. Furthermore, although specific distributions of responsibilities are defined above for purposes of discussion, the various functions and responsibilities might be distributed and divided in different ways, depending on particular circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

Furthermore, although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A computer-implemented method performed by one or more processors configured with specific instructions, the computer-implemented method comprising:
   receiving, at a first computing device in a network affiliated with a wireless service provider, a request from a first client computing device to initiate a communication from an originating number to a destination number, wherein the first computing device is assigned to handle requests from the first client computing device;
   identifying that the originating number is assigned to a second client computing device that is different from the first client device; and
   transmitting data to a second computing device in the network affiliated with the wireless service provider, the data including identifying data associated with the first computing device, wherein the second computing device is assigned to handle requests received from the second client computing device associated with the originating number.

2. The computer-implemented method of claim 1, wherein identifying that the originating number is registered to the second client computing device is based, at least in part, on registration data maintained by the wireless service provider.

3. The computer-implemented method of claim 1, wherein the first computing device is a first application server and the second computing device is a second application server located within an IP Multi-Media Subsystem (IMS) associated with the wireless service provider.

4. The computer-implemented method of claim 1, wherein transmitting the data to the second computing device in the network, comprises including the data within one or more of a header of a Session Initiation Protocol (SIP) message, or a Multi-Purpose Internet Mail Extensions (MIME) attachment to a SIP method.

5. The computer-implemented method of claim 4, wherein the data further indicates a location of the first client device, and a length of a communication with a third client computing device associated with the destination number.

6. The computer-implemented method of claim 4, wherein transmitting the data to the second computing device in the network affiliated with the wireless service provider, comprises one or more of a serving call session-control function (SCSCF) node, a SIP registration node, a proxy, or an application server transmitting the data to the second computing device.

7. The computer-implemented method of claim 1, further comprising updating a billing record of a customer of the wireless service provider to reflect communications made using a different number.

8. A non-transitory computer-readable media storing computer-executable instructions that, when executed, cause one or more processors of a computing device to perform acts comprising:
   receiving, from a first client computing device, a request to initiate a communication from an originating number to a destination number;
   identifying that the originating number is associated with a second client computing device that is different from the first client device;
   identifying a second computing device assigned to handle requests received from the second client computing device; and
   transmitting data to the second computing device, the data including identifying data associated with the first client computing device.

9. The non-transitory computer-readable media of claim 8, wherein identifying that the originating number is associated with the second client computing device comprises accessing registration data maintained by the wireless service provider.

10. The non-transitory computer-readable media of claim 8, wherein transmitting the data to the second computing device, comprises including the data within one or more of a header of a Session Initiation Protocol (SIP) message or a or a Multi-Purpose Internet Mail Extensions (MIME) attachment transmitted from a node within a network affiliated with a wireless service provider.

11. The non-transitory computer-readable media of claim 8, wherein the data further indicates a location of the first client device.

12. The non-transitory computer-readable media of claim 8, wherein the first computing device is a first application server and the second computing device is a second application server located within an IP Multi-Media Subsystem (IMS) associated with the wireless service provider.

13. The non-transitory computer-readable media of claim 8, further comprising updating a billing record of a customer of the wireless service provider to reflect communications made using a different number.

14. The non-transitory computer-readable media of claim 8, wherein identifying the second computing devices associated with the destination number comprises identifying one or more E.164 addresses or International Mobile Subscriber Identities (IMSI) that are associated with the destination number.

15. The non-transitory computer-readable media of claim 8, wherein the first client computing device and the second client computing device are associated with different subscribers of a wireless service provider.

16. A system comprising:
a first computing device and a second computing device, the first computing device and the second computing device associated with a wireless service provider;
the first computing device including one or more first processors and one or more first memories storing first instructions that, when executed by the one or more first processors, perform first acts including
receiving, from a first client computing device, a request to initiate a communication from an originating number to a destination number,
identifying that the originating number is associated with a second client computing device that is different from the first client device,
identifying that the second computing device is assigned to handle requests received from the second client computing device, and
transmitting data to the second computing device, the data including identifying data and location data associated with the first client computing device associated with the request to initiate the communication from the originating number associated with the second client computing device; and
the second computing device including one or more second processors and one or more second memories storing second instructions that, when executed by the one or more second processors, perform second acts including
receiving, from the first computing device, the data including the identifying data and the location data associated with the first client computing device, and
updating a record associated with the second client computing device, the record maintained, at least in part, by the second computing device.

17. The system of claim 16, wherein identifying that the originating number is associated with the second client computing device comprises accessing data maintained by the wireless service provider.

18. The system of claim 16, wherein transmitting the data to the second computing device, comprises including the data within a header of a Session Initiation Protocol (SIP) message.

19. The system of claim 16, wherein the data further indicates a length of a communication with a third client computing device associated with the destination number.

20. The system of claim 16, wherein the first computing device is a first application server and the second computing device is a second application server located within an IP Multi-Media Subsystem (IMS) associated with the wireless service provider.

* * * * *